(12) United States Patent
Stubbs et al.

(10) Patent No.: US 7,530,079 B2
(45) Date of Patent: May 5, 2009

(54) MANAGING APPLICATION CUSTOMIZATION

(75) Inventors: Paul Stubbs, Redmond, WA (US); Philo N. Nordlund, Seattle, WA (US); John A. Shepard, Seattle, WA (US); Thomas E. Quinn, Seattle, WA (US); C. Douglas Hodges, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/470,863

(22) Filed: Sep. 7, 2006

(65) Prior Publication Data

US 2008/0066051 A1 Mar. 13, 2008

(51) Int. Cl.
*G06F 13/00* (2006.01)

(52) U.S. Cl. .............. 719/320; 717/100; 717/101; 717/106; 717/120

(58) Field of Classification Search ............ 717/107, 717/100, 101, 106, 120; 719/320
See application file for complete search history.

(56) References Cited

U.S. PATENT DOCUMENTS

| | | | |
|---|---|---|---|
| 5,432,903 A | 7/1995 | Frid-Nielsen | |
| 6,006,034 A * | 12/1999 | Heath et al. | 717/170 |
| 6,108,661 A * | 8/2000 | Caron et al. | 707/102 |
| 6,246,404 B1 | 6/2001 | Feigner et al. | |
| 6,314,559 B1 | 11/2001 | Sollich | |
| 6,393,437 B1 | 5/2002 | Zinda et al. | |
| 6,446,097 B1 | 9/2002 | Glaser | |
| 6,502,233 B1 | 12/2002 | Vaidyanathan et al. | |
| 6,578,045 B1 * | 6/2003 | Gray et al. | 707/103 R |
| 6,591,244 B2 | 7/2003 | Jim et al. | |
| 6,609,246 B1 | 8/2003 | Guhr et al. | |
| 6,742,175 B1 | 5/2004 | Brassard | |
| 6,799,718 B2 | 10/2004 | Chan et al. | |
| 6,965,990 B2 | 11/2005 | Barsness et al. | |
| 7,000,220 B1 | 2/2006 | Booth | |
| 7,032,219 B2 | 4/2006 | Mowers et al. | |
| 7,281,245 B2 * | 10/2007 | Reynar et al. | 717/173 |
| 2002/0041289 A1 | 4/2002 | Hatch et al. | |
| 2002/0184610 A1 | 12/2002 | Chong et al. | |
| 2003/0014389 A1 | 1/2003 | Hashimoto et al. | |
| 2004/0003371 A1 | 1/2004 | Coulthard et al. | |
| 2004/0015837 A1 | 1/2004 | Worthington et al. | |
| 2004/0158811 A1 | 8/2004 | Guthrie et al. | |

(Continued)

OTHER PUBLICATIONS

U.S. Appl. No. 11/470,896, Stubbs et al.

(Continued)

*Primary Examiner*—Andy Ho
(74) *Attorney, Agent, or Firm*—Perkins Coie LLP

(57) ABSTRACT

A facility is provided for managing application customization. In various embodiments, an application associated with the facility receives an indication of an application identifier that identifies a customized instance of the application, determines whether the customized instance of the application is available and, when the customized instance of the application is available, configures the application to employ a resource associated with the customized instance of the application. The facility can receive an identifier and an indication to update common components of an application, the application having a customized instance of the application; remove components associated with the customized instance of the application; copy common components associated with the application; associate the common components with the received identifier; and apply customizing components that customize the common components of the application to create a customized instance of the application.

19 Claims, 5 Drawing Sheets

U.S. PATENT DOCUMENTS

| | | | |
|---|---|---|---|
| 2004/0188511 | A1* | 9/2004 | Sprigg et al. ............... 235/375 |
| 2004/0193599 | A1 | 9/2004 | Liu et al. |
| 2004/0193682 | A1 | 9/2004 | Deboer et al. |
| 2004/0205200 | A1 | 10/2004 | Kothari et al. |
| 2004/0205708 | A1 | 10/2004 | Kothari et al. |
| 2005/0066304 | A1* | 3/2005 | Tattrie et al. ............... 717/101 |
| 2005/0114475 | A1 | 5/2005 | Chang et al. |
| 2005/0138034 | A1 | 6/2005 | Faraj |
| 2005/0183059 | A1 | 8/2005 | Loksh et al. |
| 2005/0262432 | A1 | 11/2005 | Wagner |
| 2005/0278695 | A1 | 12/2005 | Synovic |
| 2006/0075352 | A1 | 4/2006 | Burke et al. |
| 2006/0080329 | A1 | 4/2006 | Skibo et al. |
| 2006/0080468 | A1 | 4/2006 | Vadlamani et al. |
| 2006/0080639 | A1 | 4/2006 | Bustelo et al. |
| 2006/0111888 | A1 | 5/2006 | Hiew et al. |
| 2006/0117320 | A1 | 6/2006 | Garms et al. |
| 2006/0130038 | A1 | 6/2006 | Claussen et al. |

OTHER PUBLICATIONS

U.S. Appl. No. 11/470,909, Stubbs et al.

U.S. Appl. No. 11/470,959, Davis et al.

"MetaWare IDE," © 2007 ARC International, http://www.arc.com/software/development/metawareides.html.

"Take a tour on PhpED IDE features," NuSphere, © 2006 NuSphere Corporation, http://www.nusphere.com/products/tour.htm.

"Working with Xcode: Building Applications for the Future," Updated Mar. 7, 2006, Developer Connection, Tools, © 2007 Apple Inc., http://developer.apple.com/tools/xcode/xcodefuture.html.

ATSU/TA, Satoshi and Saeko Matsuura, "eXtreme Programming Support Tool in Distributed Environment," COMPSAC Workshops, 2004, pp. 32-33.

Bowman, Ivan, "An Architectural Investigation: Extracting Architectural Facts From a Large Software System," Apr. 7, 1998, Department of Computer Science, University of Waterloo Paper, http://plg.uwaterloo.ca/~jtbowman/CS7466/proj/Project.html.

des Rivieres, J. and J. Wiegand, "Eclipse: A platform for integrating development tools." IBM Systems Journal, vol. 43, No. 2, 2004, © 2004 IBM, pp. 371-383.

Hupfer, Susanne et al., "Introducing Collaboration into an Application Development Environment," CSCW'04, Nov. 2004, Chicago, Illinois, vol. 6, Issue 3, © 2004 ACM, pp. 21-24.

Kurbel, Karl, Andirzej Dabkowski and Ploft Zajac, "Software Technology for WAP Based M-commerce—A Comparative Study of Toolkits for the Development of Mobile Applications," Proceedings of the International Conference WWW/Internet 2002, Lisbon, Portugal, Nov. 2002, pp. 873-880.

MacFarlane, Ian A. and Ian Reilly. "Requirements Traceability in an Integrated Development Environment," © 1995 IEEE, pp. 115-123.

Mehra, Dr. Anshu and Dr. Virginio Chiodini, "An Integrated Development Environment for Distributed Multi-Agent Applications," © 1998 IEEE, pp. 451-452.

Slovak, Kim, Chris Burnham and Dwayne Gifford, "Chapter 7 COM Add-ins," Professional Outlook 2000 Programming; With VBA, Office and CDG, ISBN 1-861003-31-5, Wrox Press, 1999, pp. 247-290.

Szczur, Martha R. and Sheppard, Sylvia B., "TAE: Plus Transportable Applications Environment Plus: A User Interface Development Environment," ACM Transactions on Information Systems, vol. 11, No. 1, Jan. 1993, © 1993 ACM, pp. 76-101.

Watson, Gregory R. and Craig E. Rasmussen, "A Strategy for Addressing the Needs of Advanced Scientific Computing Using Eclipse as a Parallel Tools Platform." Dec. 2005, Los Alamos National Laboratory, Los Alamitos, New Mexico, White Paper, LA-UR-05-9114, pp. 1-12.

* cited by examiner

MANAGING APPLICATION CUSTOMIZATION

CROSS-REFERENCE TO RELATED APPLICATION(S)

This patent application is related to U.S. patent application Ser. No. 11/470,959, filed Sep. 7, 2006, entitled "APPLICATION PROXY," U.S. patent application Ser. No. 11/470,909 filed Sep. 7, 2006, entitled "CONNECTING WITH AN APPLICATION INSTANCE," and U.S. patent application Ser. No. 11/470,896, filed Sep. 7, 2006, entitled "CONTROLLING APPLICATION FEATURES," which applications are being filed concurrently and which are hereby incorporated by reference in their entireties.

BACKGROUND

Software developers generally use integrated development environments ("IDEs") to edit, build, and debug applications. An example of an IDE is MICROSOFT VISUAL STUDIO, which is a software development tool that is provided by MICROSOFT CORPORATION. IDEs provide a user interface that developers can use to develop software components and applications. IDEs generally include developer tools, such as a source code editor, a compiler and/or interpreter, a build-automation tool, and a debugger. IDEs may also include a version control system and other tools to simplify construction of a graphical user interface ("GUI").

IDEs can have various containers for constituents of applications, such as image files, source code files, libraries, and so forth. As examples, IDEs can have solution and project containers. A solution container can contain, among other things, one or more project containers. The project containers can contain constituents of applications. The constituents of the applications can be "built" by the IDE's developer tools (e.g., compiler), such as by translating human-readable source code to machine-executable object code. Each project container can be said to be a different project type because it can provide support for a different programming language. Examples of programming languages are C#, C++, MICROSOFT VISUAL BASIC, PERL, and so forth. A project container (or simply, "a project") is generally defined by a project file. The project file can indicate items associated with the project, such as various properties associated with the project, files that define the components the project contains, and so forth.

Developers employ IDEs to build software components, such as controls and add-ins. A control is generally a component that a developer adds to a form to enable or enhance a user's interaction with the form. As an example, a developer can add a Portable Document Format ("PDF") reader control to a web form so that a viewer of the web form can view a PDF document. An add-in is a component that a user can add to an application ("host application") to supplement the host application's functionality. As an example, a user can use an add-in with a MICROSOFT OFFICE host application (e.g., MICROSOFT WORD) to create a PDF document based on contents of the host application.

A computing device may store multiple IDE configurations, such as a standard, fully featured IDE and other instances of the IDE that are configured for use with particular applications. As examples, a computing device may store a standard, fully featured IDE, an instance of the IDE for use with MICROSOFT OFFICE applications, and other instances of the IDE for use with applications developed by other software companies. When a vendor of the IDE desires to modify the IDE, such as to fix a bug, release a patch, or update to a new version, the vendor may need to communicate with the parties responsible for releasing each different configuration or instance. This can cause logistical problems because each instance of the IDE may need to be separately patched or upgraded. Moreover, each instance occupies system resources, such as disk storage and registry space. However, installing a single IDE is problematic because each application may need an instance of the IDE that is uniquely configured for use with the application.

SUMMARY

A facility is provided for managing application customization. The facility can employ an application identifier to uniquely select an application instance. When a customized instance of the application instance is installed, common components can be employed for all instances. The common components include files, registry entries, and other components associated with applications. During installation of each customized instance of the application, additional components ("customization components") can be installed. These customization components are associated with the specified application identifier. The customization components can add, replace, modify, or remove the common components. As examples, files and registry entries associated with the common components can be added to, replaced, modified, or removed by the customization components. Adding, replacing, or modifying the common components for use with the instance of the application identified by the application identifier enables the application to be customized.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1A:
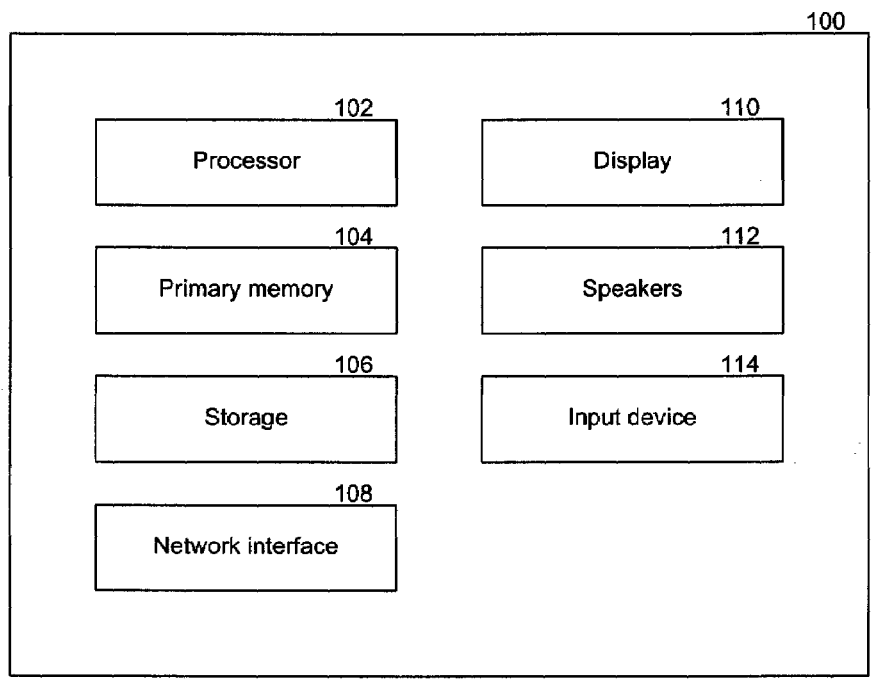
FIG. 1A is a block diagram illustrating an example of a suitable computing environment in which the facility may operate in some embodiments.

A facility is provided for managing application customization. In various embodiments, the facility employs an application identifier to uniquely select an application instance. When a customized instance of the application instance is installed, common components can be employed for all instances. As an example, a copy of the common components can be made for each instance. Alternatively, each instance may load and use the common components. The common components include files, registry entries, and other components associated with applications.

The common components can be customized for each instance. During installation of each customized instance of the application, additional components ("customization components") can be installed. These customization components can be associated with the specified application identifier. The customization components can add, replace, modify, or remove the common components. As examples, files and registry entries associated with the common components can be added to, replaced, modified, or removed by the customization components. Adding, replacing, or modifying the common components for use with the instance of the application identified by the application identifier enables the application to be customized.

The common and customization components can be installed by using an installation package, such as MICROSOFT INSTALLER ("MSI"). An installation package can contain components and instructions for their installation. As an example, the installation package can indicate component names, how components are to be installed or modified, registry entries and locations, and so forth. Thus, an installation package corresponding to the customization components can identify the common components that are to be replaced, modified, or removed.

When the application is started, it may be provided with an application identifier corresponding to the customized instance that is desired. As an example, when an application starts an IDE, it may indicate the application identifier associated with the application so that the appropriate customized version of the IDE can be started. Upon receiving the application identifier, the IDE can perform the required customizations. As an example, the IDE can set its environment to use the common components as customized by the customization components, such as by using a folder that stores the customized instance of the IDE, a portion of the registry associated with the customized IDE, and so forth. When the application (e.g., IDE) receives no application identifier, it may provide a standard, fully featured version.

In various embodiments, the customization can include creating a full copy of the common components for use with the customized instance. As an example, during installation of a customized instance, the facility can create a folder and registry "hive" for the customized instance. A registry hive is a portion of a registry that stores registry entries, such as in a subtree of a registry tree. The created folder and registry hive can be associated with the application identifier corresponding to the customized instance. A complete copy of the common components can be copied to the created folder and registry hive that the facility creates for the customized instance. The customization components can then be applied to the created folder and registry hive, such as to add components, remove components, modify components, or replace components. When the customized instance of the application starts, it can employ the created folder and registry hive so that the application is customized.

When common components of the application are modified, such as to apply a patch or otherwise update an application, the customized instances can be reinstalled. As an example, the customized applications can be reinstalled in the same manner as they were originally installed. By reinstalling the common components and reapplying the customized components, the customized instances of the application are said to be "regenerated."

Thus, the facility can employ an application identifier during installation and starting of an application to install and configure customized instances.

When a customized instance starts, it may have a complete and isolated folder, registry hive, cache, and so forth. The customized instance of the application can be started by a user, another application, and so forth. The application identifier can be provided as a command line parameter, an attribute of an invocation of an application programming interface method, a property stored in a file the application loads, and so forth.

In various embodiments, multiple customizations can be applied. As an example, the facility can apply several customization components to common components.

When the facility is used with IDEs, the application identifier can be stored in a project file so that the IDE loads the appropriate customizations when it loads the project.

Registries, folders, and other components can be referred to as "resources."

The facility is described in more detail in reference to the Figures. FIG. 1A is a block diagram illustrating an example of a suitable computing environment 100 in which the facility may be implemented. A system for implementing the facility includes a general purpose computing device in the form of the computing system ("computer") 100. Components of the computer 100 may include, but are not limited to, a processing unit 102, a system primary memory 104, a storage unit 106, a network interface or adapter 108, a display 110, one or more speakers 112, and an input device 114.

The computer 100 typically includes a variety of computer-readable media that are operable with the storage unit 106. Computer-readable media can be any available media that can be accessed by the computer 100 and include both volatile and nonvolatile media and removable and nonremovable media.

The computer 100 may operate in a networked environment using logical connections to one or more remote computers. A remote computer may be a personal computer, a server, a router, a network PC, a peer device, or other common network node, and typically includes many or all of the elements described above in relation to the computer 100. A logical connection can be made via a local area network (LAN) or a wide area network (WAN), but may also be made via other networks. Such networking environments are commonplace in homes, offices, enterprise wide computer networks, intranets, and the Internet. The computer 100 can be connected to a network through the network interface 108, such as to a wired or wireless network.

The computer 100 is only one example of a suitable computing environment and is not intended to suggest any limitation as to the scope of use or functionality of the facility. Neither should the computing system environment be interpreted as having any dependency or requirement relating to any one or a combination of the illustrated components.

The facility is operational with numerous other general purpose or special purpose computing system environments or configurations. Examples of well-known computing systems, environments, and/or configurations that may be suitable for use with the facility include, but are not limited to, personal computers, server computers, handheld or laptop devices, cellular telephones, tablet devices, multiprocessor systems, microprocessor-based systems, set-top boxes, programmable consumer electronics, network PCs, minicomputers, mainframe computers, distributed computing environments that include any of the above systems or devices, and the like.

The facility may be described in the general context of computer-executable instructions, such as program modules, that are executed by a computer. Generally, program modules include routines, programs, objects, components, data structures, and so forth that perform particular tasks or implement particular abstract data types. The facility may also be employed in distributed computing environments where tasks are performed by remote processing devices that are linked through a communications network. In a distributed computing environment, program modules may be located in local and/or remote computer storage media, including memory storage devices.

Figure 1B:
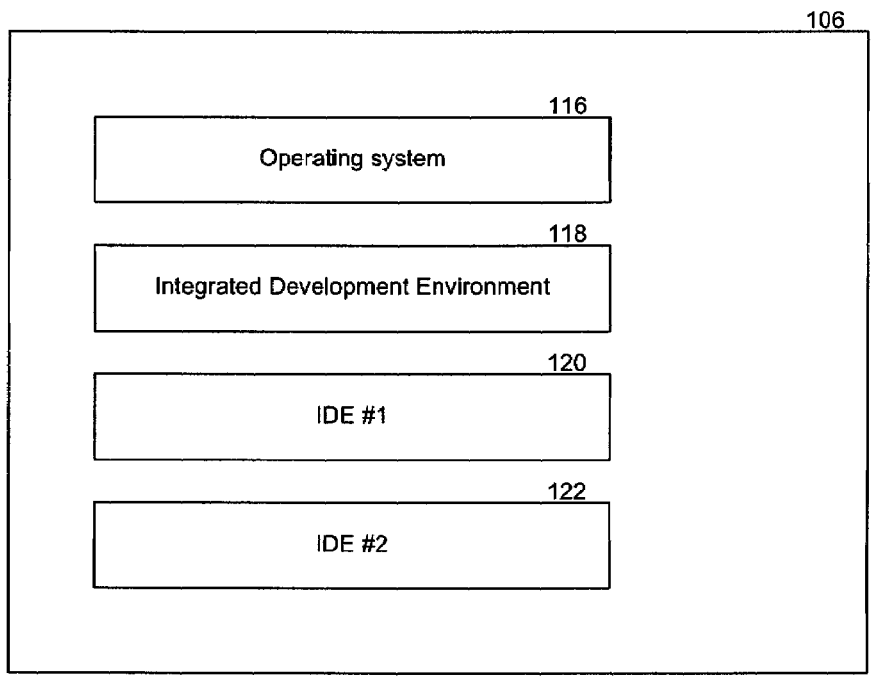
FIG. 1B is a block diagram illustrating a storage unit of FIG. 1A in further detail in some embodiments.

FIG. 1B is a block diagram illustrating a storage unit of FIG. 1A in further detail in some embodiments. According to the illustrated embodiment, the storage unit 106 stores an operating system 116, an IDE 118, and one or more customized instances of the IDE, such as IDE #1 120 and IDE #2 122. The IDE can be any IDE that a software developer can employ during development, such as MICROSOFT VISUAL STUDIO. In some embodiments, the IDE may provide a common framework that can be customized for various uses. As an example, a version of MICROSOFT VISUAL STUDIO can be employed with MICROSOFT OFFICE to create, modify, or debug macros. The common components associated with the IDE can be referred to as "core" components.

While various functionalities and data are shown in FIGS. 1A and 1B as residing on particular computer systems that are arranged in a particular way, those skilled in the art will appreciate that such functionalities and data may be distributed in various other ways across computer systems in different arrangements. While computer systems configured as described above are typically used to support the operation of the facility, those skilled in the art will appreciate that the facility may be implemented using devices of various types and configurations, and having various components.

The techniques can be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Figure 2:
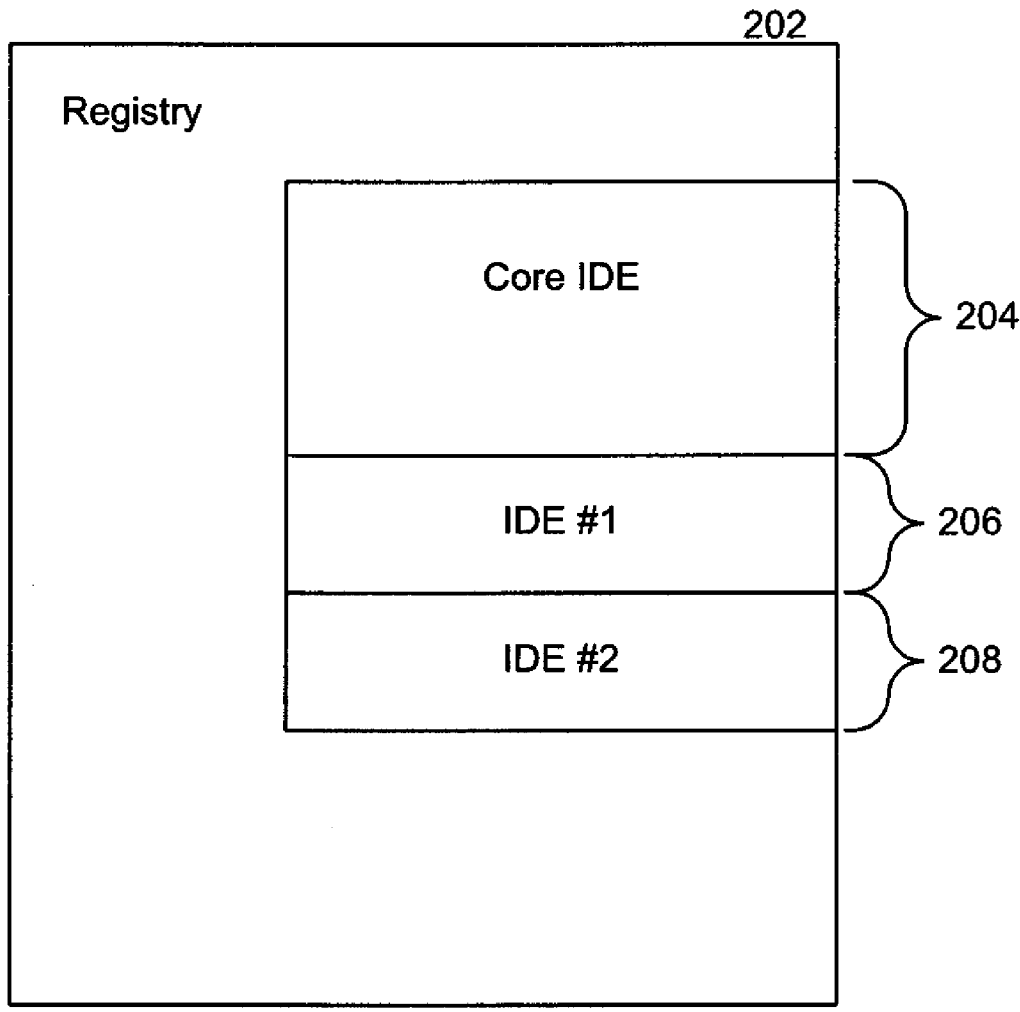
FIG. 2 is a block diagram illustrating a registry associated with the facility in some embodiments.

FIG. 2 is a block diagram illustrating a registry associated with the facility in some embodiments. The registry 202 includes one or more registry hives associated with a customizable application, such as an IDE. In the illustrated embodiment, an IDE has a core IDE registry hive 204 and customized registry hives 206 and 208. The customized registry hives can contain portions of the core registry that are to be modified for the customized instances of the IDE. As examples, the customized portions of the registry hive can include customizations such as titles of windows, colors, indications of which windows should be enabled or disabled, and so forth. The customized registry hives can be employed to modify a copy of the core registry hive.

Figure 3:
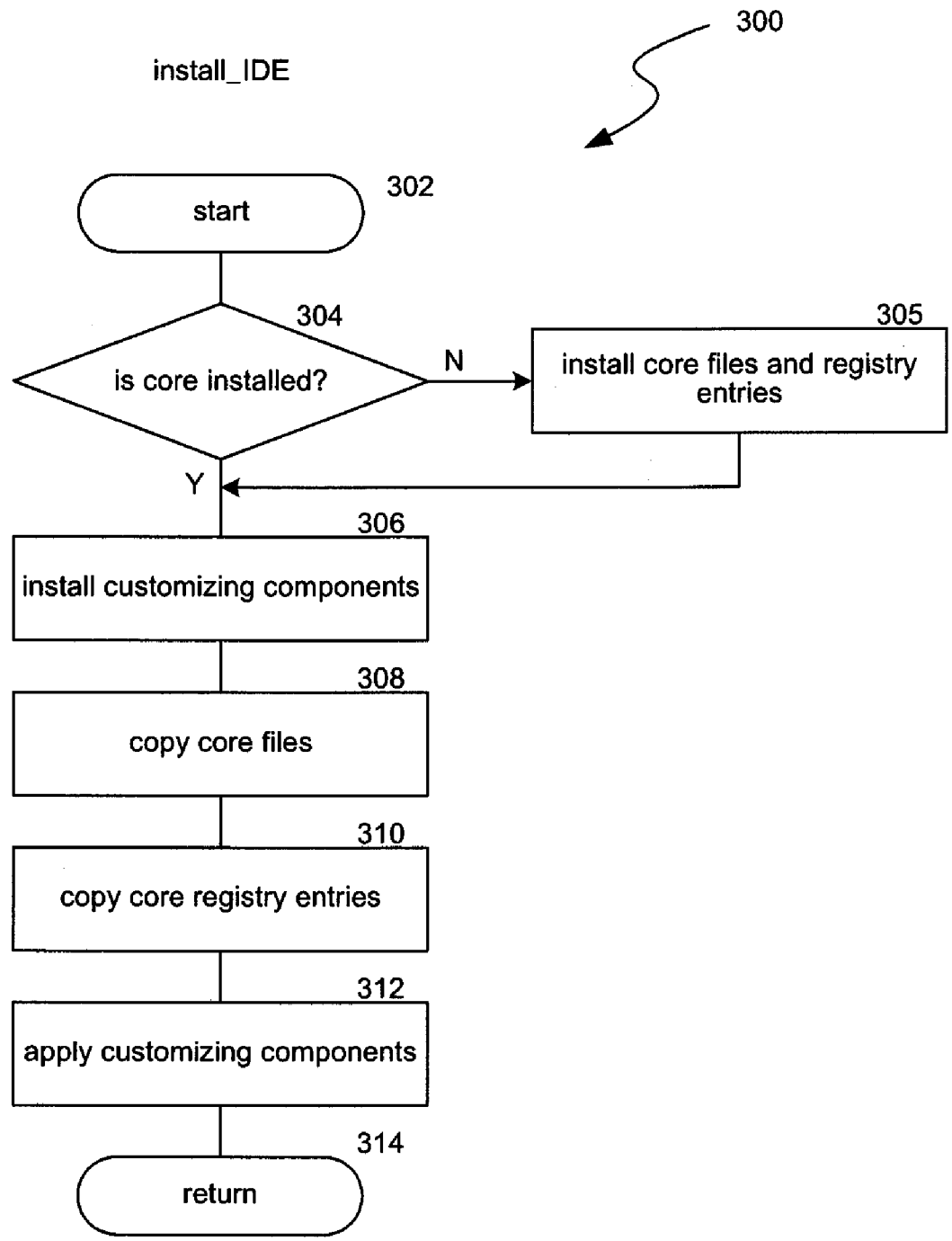
FIG. 3 is a flow diagram illustrating an install_IDE routine invoked by the facility in various embodiments.

FIG. 3 is a flow diagram illustrating an install_IDE routine invoked by the facility in various embodiments. The facility can invoke the install_IDE routine 300 when installing a customized instance of the IDE. The routine begins at block 302.

At decision block 304, the routine determines whether a core portion of the IDE (e.g., the common components) has already been installed. If the core portion of the IDE has already been installed, the routine continues at block 306. Otherwise, the routine continues at block 305.

At block 305, the routine installs core files, registry entries, and other common components associated with the IDE. The facility can copy these core components when creating a customized instance of the IDE.

At block 306, the routine installs additional customizing components, such as files and registry entries associated with the customized instance of the IDE. As an example, the customized instance of the IDE can include additional tools associated with the IDE that may not be provided by the core installation.

At block 308, the routine copies the core files associated with the IDE, such as to a folder that will contain a customized instance of the IDE.

At block 310, the routine copies core registry entries associated with the IDE. As an example, the routine may create a registry hive for the customized instance of the IDE and copy these registry entries into the created registry hive.

At block 312, the routine applies the installed customizing components to the files and registry entries copied at blocks 308 and 310. As an example, the routine may add, remove, replace, or modify the files copied from the core portion.

At block 314, the routine returns.

Figure 4:
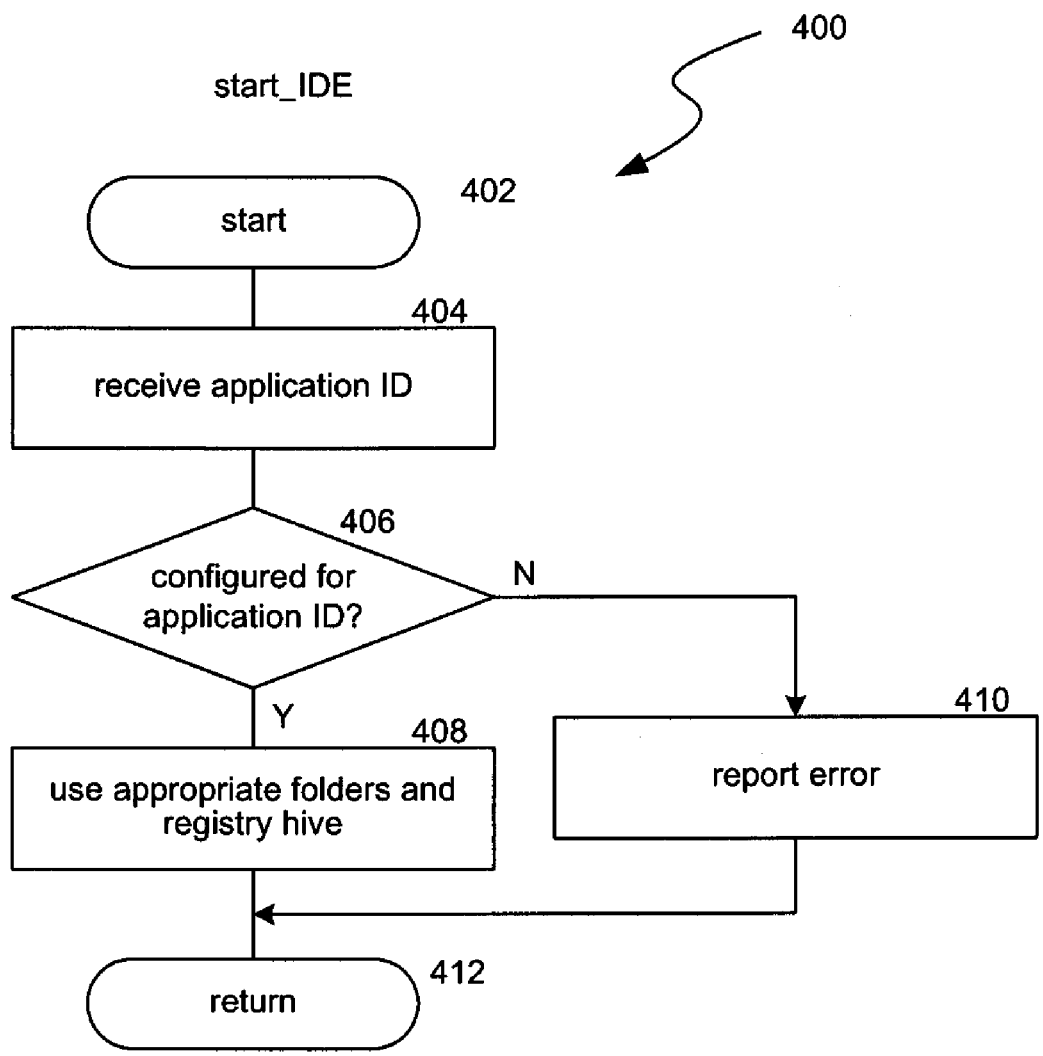
FIG. 4 is a flow diagram illustrating a start_IDE routine invoked by the facility in various embodiments.

FIG. 4 is a flow diagram illustrating a start_IDE routine invoked by the facility in various embodiments. The facility can invoke the routine 400 when starting the IDE. The routine begins at block 402.

At block 404, the routine receives an identifier that identifies the desired customized IDE, such as an application identifier. As an example, when the IDE is started, the IDE may receive an indication of the identifier from a component that is starting the IDE, such as another application.

At decision block 406, the routine determines whether a customized IDE has been configured for the indicated identifier. If a customized IDE has been configured for the indicated identifier, the routine continues at block 408. Otherwise, the routine continues at block 410.

At block 408, the routine configures the IDE to employ the appropriate files and registry keys associated with the customized IDE. As an example, the routine may set its environment to employ the folders and registry hives associated with the customized IDE that is indicated by the identifier.

At block 410, the routine reports an error. As an example, the routine may indicate that the identified customized IDE has not been installed or is unavailable. In some embodiments, instead of reporting an error, the routine may load the standard, fully featured version of the IDE.

At block 412, the routine returns.

Figure 5:
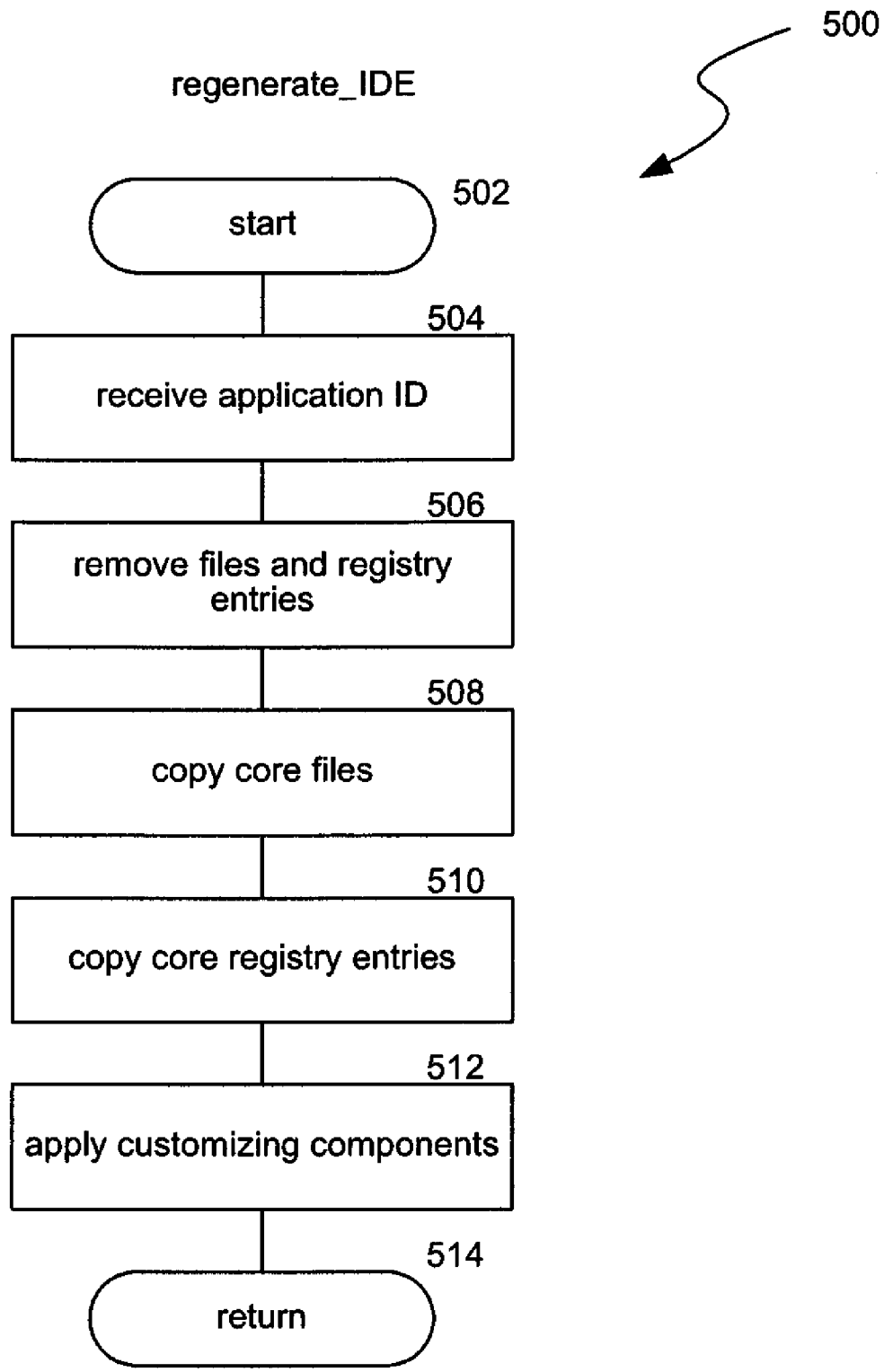
FIG. 5 is a flow diagram illustrating a regenerate_IDE routine invoked by the facility in various embodiments.

FIG. 5 is a flow diagram illustrating a regenerate_IDE routine invoked by the facility in various embodiments. The facility invokes the regenerate_IDE routine 500 when modifying the core files, registry entries, or other components associated with the IDE. As an example, the facility may invoke the regenerate_IDE routine when a vendor of the core IDE updates the IDE. The routine begins at block 502.

At block 504, the routine receives an identifier associated with a customized IDE, such as an identifier of the application that starts the IDE.

At block 506, the routine removes files, registry entries, and other components associated with the identified customized IDE.

At block 508, the routine copies the core files associated with the IDE, such as to a folder that will contain a customized instance of the IDE.

At block 510, the routine copies core registry entries associated with the IDE. As an example, the routine may create a registry hive for the customized instance of the IDE and copy these registry entries into the created registry hive.

At block 512, the routine applies the installed customizing components to the files and registry entries copied at blocks 508 and 510. As an example, the routine may add, remove, replace, or modify the files copied from the core portion.

At block 514, the routine returns.

Those skilled in the art will appreciate that the logic illustrated in the flow diagrams and described above may be altered in a variety of ways. For example, the order may be rearranged, substeps may be performed in parallel, shown logic may be omitted, or other logic may be included, etc. In various embodiments, the functionality provided by the facility can be adapted in such a way that alternate components provide portions of the described logic.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a computing system for managing application customization, comprising:
   receiving an application identifier for an application and an indication to update common components of the application, the application having a customized instance of the application;
   removing components associated with the customized instance of the application;
   copying common components associated with the application;
   associating the common components with the received identifier;
   applying customizing components that customize the common components of the application to create a customized instance of the application;
   receiving a first identifier with an indication to start the customized instance of the application corresponding to the first identifier;
   starting the customized instance of the application;
   receiving a second identifier with an indication to start another customized instance of the application corresponding to the second identifier wherein the other customized instance of the application is different from the customized instance of the application; and
   starting the second customized instance of the application wherein the customized instance of the application and the other customized instance of the application both execute the common components but provide different functionality.

2. The method of claim 1 wherein the removing includes removing files and registry entries associated with the customized instance of the application.

3. The method of claim 1 further comprising:
   starting the customized instance of the application;
   receiving another identifier; and
   reading a registry entry associated with the customized instance of the application based on the received another identifier.

4. The method of claim 3 further comprising loading a file from a folder associated with the customized instance of the application.

5. The method of claim 3 wherein the another identifier is received from a file the application loads.

6. The method of claim 5 wherein the file is a project file.

7. A system for managing application customization, comprising:
   a first component executed by a processor that, upon receiving an indication to update a first application, deletes components associated with a second application, the second application identified as an instance of the first application, updates common components associated with the first application, copies the updated common components to a location associated with the second application, and applies customizing components associated with the second application; and
   a second component executed by the processor that, upon receiving an indication to start the second application and an application identifier identifying the second application, causes the second application to employ a resource associated with the second application wherein the resource corresponds to the received identifier wherein the first application and the second application both execute the common components but provide different functionality.

8. The system of claim 7 wherein the first application is an integrated development environment.

9. The system of claim 8 wherein the integrated development environment is MICROSOFT VISUAL STUDIO.

10. The system of claim 8 wherein the second application is a customized instance of the integrated development environment.

11. The system of claim 9 wherein the second application is a version of MICROSOFT VISUAL STUDIO that is customized for a MICROSOFT OFFICE application.

12. The system of claim 7 wherein the first and second identifiers are equivalent.

13. The system of claim 7 wherein the resource is a registry entry.

14. The system of claim 7 wherein the resource is a folder in which a file is stored.

15. The system of claim 7 wherein the second component receives the identifier from a project file that the second application opens.

16. A computer-readable medium having computer-executable instructions that, when executed, perform a method for managing application customization, the method comprising:
   receiving by an application an indication of an application identifier, the application identifier identifying a customized instance of the application;
   determining whether the customized instance of the application is available; and
   when the customized instance of the application is available, configuring the application to employ a resource associated with the customized instance of the application wherein the resource is not employed when a different application identifier is received.

17. The computer-readable medium of claim 16 wherein a resource is identified by a registry hive.

18. The computer-readable medium of claim 16 wherein the application identifier identifies one of several customized instances of the application.

19. The computer-readable medium of claim 16 wherein the application is an integrated development environment.

* * * * *